United States Patent
De'Longhi

[11] Patent Number: 5,682,920
[45] Date of Patent: Nov. 4, 1997

[54] VALVE DEVICE FOR PRIMING A PUMP, PARTICULARLY FOR COFFEE MAKING MACHINES

[75] Inventor: Giuseppe De'Longhi, Treviso, Italy

[73] Assignee: De'Longhi SPA, Treviso, Italy

[21] Appl. No.: 498,718

[22] Filed: Jul. 3, 1995

[30] Foreign Application Priority Data

Jul. 1, 1994 [IT] Italy ................................ MI940474 U

[51] Int. Cl.⁶ ............................................ F16K 24/00
[52] U.S. Cl. .................... 137/341; 99/281; 137/493.2; 137/512.3; 137/860
[58] Field of Search ........................... 99/280, 281, 282, 99/283; 137/493.2, 512.3, 860, 341

[56] References Cited

U.S. PATENT DOCUMENTS 3,741,675  6/1973  Porter et al. .
3,789,871  2/1974  Tupper ........................... 137/493.2

FOREIGN PATENT DOCUMENTS 0 495 306  7/1992  European Pat. Off. .
2 364 640  4/1978  France .
2 138 888  10/1984  United Kingdom .

*Primary Examiner*—Gerald A. Michalsky
*Attorney, Agent, or Firm*—Herbert Dubno; Yuri Kateshov

[57] ABSTRACT

Valve device for priming a pump includes a body having a first conduit connected to a pump for sucking water from a tank, a second conduit for connecting the body to a heater provided with a calibrated delivery valve for delivering superheated water, and a third conduit for discharging air during the priming of said pump, a valve for a free passage of water from the body to the heater and for the flow back of the water into the body only when the pressure inside the heater has reached a selected value near, but lower than, the pressure setting of the calibrated delivery valve.

8 Claims, 2 Drawing Sheets

VALVE DEVICE FOR PRIMING A PUMP, PARTICULARLY FOR COFFEE MAKING MACHINES

FIELD OF THE INVENTION

The present invention relates to a valve device for priming a pump, particularly for coffee making machines.

BACKGROUND OF THE INVENTION

Conventional coffee machines have a pump for drawing water from a tank or reservoir and feeding the water to a heater where it is superheated and, when the required pressure is reached, sent to a coffee holder filter through a valve.

It is apparent that this system has two inconveniences. The first inconvenience is that when the tank empties, the pump draws air and therefore, even when the tank is again filled with water, it is not possible to prime it before purging the air out of the pump.

The second inconvenience is that when the pressure inside the heater goes over the pressure setting of the calibrated water delivery valve, the valve releases water thus emptying the heater.

Valve devices have been introduced to overcome these inconveniences. These valve devices cause the automatic exit of air from the conduit connecting the pump to the heater, allowing the automatic priming of the pump, however these valve device do not prevent water from leaking out of the heater delivery valve, and/or from the air venting valve, and therefore do not prevent the heater from emptying.

OBJECT OF THE INVENTION

The principle object of the present invention is to provide a valve device overcoming the drawbacks of the prior art.

Still another object of the invention is to provide a valve device which prevents water from exiting from the air venting valve, thus preventing the heater from emptying;

A further object of the invention is to provide an extremely compact valve device having a single discharge conduit for the air, for priming the pump, and for the water, from the safety valve;

Still a further object of the invention is to provide a valve device wherein the air discharge pipe and the heater connecting pipe can be disassembled from the main body for an easy cleaning and for an easy substitution of the seal members of the main body.

A further object of the invention is to provide a valve device which can be easily applied to existing apparatus, regardless of the configuration, because the air discharge pipe is rotatable around its axis according to the requirements.

SUMMARY OF THE INVENTION

The above objects are achieved by a valve device for priming a pump, particularly for coffee making machines, comprising a body having a first conduit connected to a pump for sucking water from a tank, a second conduit for connecting the body to a heater provided with a calibrated delivery valve for delivering superheated water, and a third conduit for discharging air during the priming of the pump, characterized in that it comprises a valve means for a free passage of the water from the body to the heater and, when the pump is deactivated, for the flow back of the water into the body only when the pressure inside the heater has reached a selected value near, but lower than, the pressure setting of the calibrated delivery valve.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
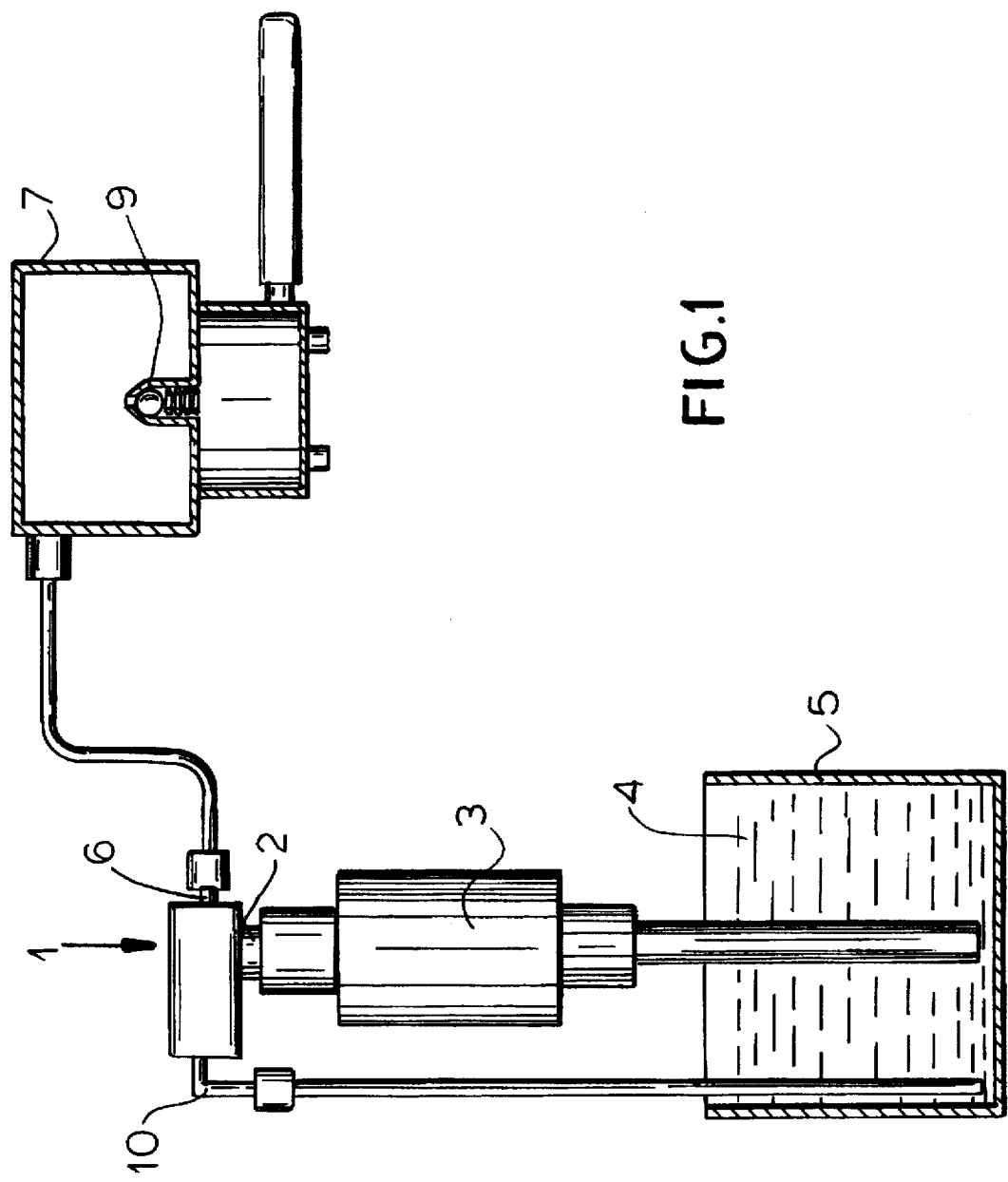
FIG. 1 is a schematic view of the feeding system of a heater in a machine for producing coffee, according to the invention.

With reference to the above figures, the valve device for priming a pump, particularly for machines for preparing coffee, is indicated by the reference numeral 1 and comprises a first conduit 2 connected to a pump 3 for sucking water 4 from a tank 5.

The body of the device also comprises a second conduit 6 for connecting the body to a heater 7 having a valve 9 for delivering superheated water inside it.

The body of the device also comprises a third conduit 10 for discharging air inside the tank 5, during priming of the pump 3.

Conveniently, the device 1 comprises valve means for allowing the water to flow from the body to the heater 7 and, when the pump 3 is inactive, for allowing the water to return inside the body only when the pressure inside the heater has reached a selected value close to, but lower than, the pressure setting of the calibrated delivery valve 9.

More particularly, the valve means comprises a mobile seal member 11, biased by an elastic means, namely a calibrated spring 12. The seal member 11 moves inside a chamber 13 connecting the first, second and third conduits 2, 6 and 10.

Figure 2:
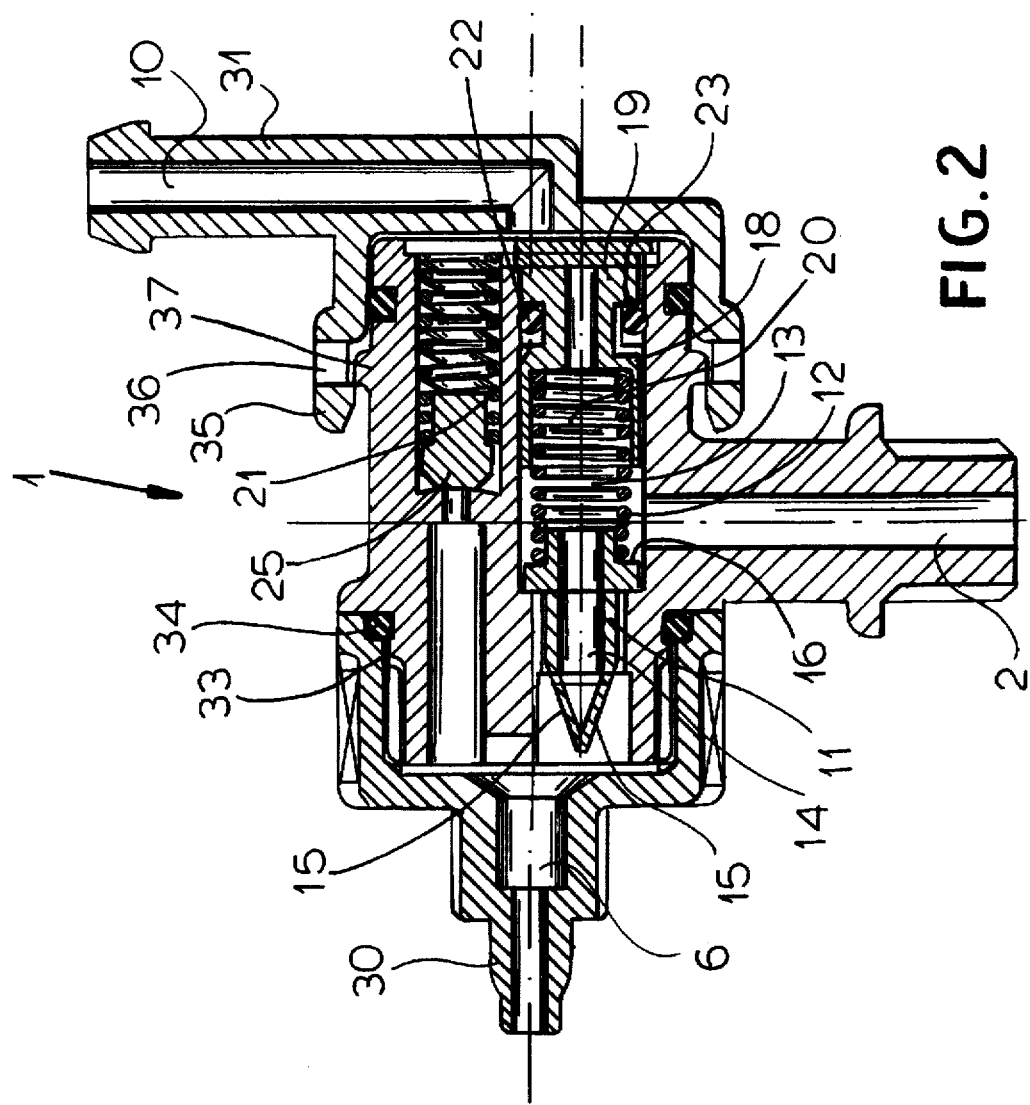
FIG. 2 is a side elevated section view of the valve device for automatically priming the pump in a machine for preparing coffee.

As illustrated in FIG. 2, the seal member 11 has an inner cavity 14 and, at one end directed towards the second conduit 6, the seal member 11 has two walls 15 which are normally closed but can be opened when the water flows from the body to the heater, when the pump is activated.

The seal member 11 may, for example, be of silicon rubber and comprises an annular ledge 16. The calibrated spring 12 abuts one side of the ledge 16, while the opposite side of the ledge provides a seal for the water coming from the heater as long as inside the heater the pressure is lower than a selected value, for example 3 bar.

Conveniently, third conduit 10 is connected to the chamber 13 through a passage 18 formed inside a closure member 19 of the chamber 13.

Closure member 19 comprises a seat 20, accommodating the calibrated spring 12, and an annular slot 21, accommodating a ring 22 providing a seal between the walls of the closure member 19 and the walls of the chamber 13.

In the region of the slot 21 in contact with the seal ring 22, the passage 18 has a reduced section 23 which is closed by the compression on the seal ring 22, when the pressure inside the chamber becomes higher than the above cited value.

A safety valve 25 is conveniently provided inside the valve device for connecting the third conduit 10 to the second conduit 6 in case the pressure reaches a dangerous high value.

It is noted that the second and third conduits 6 and 10 are arranged in first and second pipe members 30 and 31 which are removably associated with the body of the device.

In particular, the first pipe member is sealingly screwed on the device body by means of a threading 33 and a seal ring 34, while the second pipe member 31 is sealingly associated with the device body, in snap-together manner, by means of the elastic deformation of its edge 35 and of the respective slots 36 engaging a ridge 37.

In this manner the second pipe member 31 is rotatable about its own axis and therefore can be directed in any desired direction according to the requirements of the structure wherein the device is applied.

The operation of the device according to the invention is apparent from what has been described and illustrated.

In particular, the automatic priming of the pump, when it is activated, occurs when the air contained in the first conduit 2 is expelled through the passage 18 and sent inside the tank 5 through the third conduit 10.

As soon as there is no longer air in the conduit between the pump 3 and the seal member 11, the water is pumped by the pump 3 and flows into the cavity 14 of the seal member 11 and, without difficulty, the air separates the walls 15 of the seal member 11 and flows into the heater 7.

As the water is superheated inside the heater 7, the pressure will cause the water to flow back into the body of the valve device 1. In this case, the two walls 15 will tend to close, preventing the water from flowing inside the cavity 14 of the seal member 11.

Should the pressure inside the heater increase further over the preset value of the calibrated spring 12, the seal member would move from left hand side to the right hand side (with reference to FIG. 2) and therefore the water would flow inside the chamber 13. In this situation, the water will flow from the chamber 13, through the passage 18, into the third conduit 10 and then back inside the tank 5.

Because of this solution, there is no leaking of water through the calibrated delivery valve 9 arranged at the heater and the heater does not empty as long as the pressure inside the heater is lower than the pressure setting of the calibrated spring 12.

It is also to be noted that when the pump 3 pumps water inside the heater 7, the pumping pressure will make the seal ring 22 compress the reduced section 23 of passage 18, thereby preventing water from leaking out of the passage.

It has been seen in practice that the device according to the invention is particularly effective in preventing the water from leaking from the delivery valve of the heater 7 and in preventing the water from leaking out of the air discharge passage 18 when the pump 3 is primed. The materials employed, as well as the dimensions, may be any according to the specific needs and the state of the art.

Where technical features mentioned in any claim are followed by reference signs, those reference signs have been included for the sole purpose of increasing the intelligibility of the claims and accordingly, such reference signs do not have any limiting effect on the scope of each element identified by way of example by such reference signs.

I claim:

1. A device for priming a pump comprising:

a tank storing a water;

pump means for pumping the water out of said tank along a path and adapted to be controllably activated;

a first conduit being in flow communication with said pump for conveying the water from said tank;

heat means downstream from said pump means along said path and in flow communication with said first conduit for heating the water and provided with a calibrating valve controllably evacuating heated water upon reaching a first predetermined pressure set for said calibrating valve from said heat means;

valve means along said path for passing the water therethrough and formed with a body located between said tank and said heat means, said body receiving said first conduit and a second conduit, said second conduit providing:

a free passage of the water from said body into said heater upon activating said pump means, a flow of the water back from said heat means into said body upon reaching a second predetermined pressure in said heat means which is lower than said first predetermined pressure of said calibrating valve, so that there is no drainage through said calibrating valve; and a third conduit on said body and operatively connected with said first conduit for discharging the air accumulated therein through said valve means upon actuating of the pump means.

2. The device defined in claim 1 wherein said valve means further comprises a chamber operatively connected with said first, second and third conduits and elastically biased hollow seal member displaceable in said chamber, said seal member having elastically deformable walls forming an end of the seal member facing said second conduit, said walls being adapted to open upon passing the water from said pump means through said body into said heat means, said seal member being formed with a ledge spaced from said end and preventing entering the water from said heat means to said body before reaching said second predetermined pressure in said heat means.

3. The device defined in claim 2 wherein said chamber has a closure spaced from said seal member and provided with:

a seat receiving elastic means for biasing said seal member, an annular slot in said closure receiving a seal ring pressed against an inner surface of said chamber, and a passage connecting said chamber with said third conduit for discharging air.

4. The device defined in claim 3 wherein said elastic means is a calibrated spring.

5. The device defined in claim 3 wherein said passage has a section extending inwardly to adapt said seal ring, said seal closing said section of the passage upon reaching a third pressure higher than said first pressure of said calibrating valve.

6. The device defined in claim 1 wherein said valve means further comprises a safety valve operatively connecting said third and second conduits.

7. The device defined in claim 1 wherein said valve means further comprises a first and second pipe members removably mounted on the body and housing respectively second and third conduits.

8. The device defined in claim 7 wherein said first pipe member is sealingly screwed and said second pipe member is snap-coupled with said body, so that said second pipe member is adapted to rotate with respect to said body.

* * * * *